INVENTOR
Roy C. Badgett
ATTORNEY

INVENTOR
Roy C. Badgett

Nov. 9, 1965  R. C. BADGETT  3,216,701

TIRE SPREADING MACHINE

Filed Sept. 1, 1964  5 Sheets-Sheet 4

INVENTOR
Roy C. Badgett
BY
ATTORNEY

United States Patent Office 3,216,701
Patented Nov. 9, 1965

3,216,701
TIRE SPREADING MACHINE
Roy C. Badgett, Kernersville, N.C.
Filed Sept. 1, 1964, Ser. No. 393,543
12 Claims. (Cl. 254—50.3)

This invention relates to a tire spreading device which may be used in the process of recapping or retreading of tires. In the process of recapping tires, it is necessary to insert into the tire casing to be recapped a stiff tube, called a bag, to support the casing while new rubber is inserted into the mold to be vulcanized to the old rubber and form the new tread. The bag is removed from the recapped casing at the end of the recapping process. Manual insertion and removal of the bag into the casing is a laborious process by reason of the stiffness of the bag and the similarity in size between the bag and the inside of the tire casing, and machines have heretofore been devised to spread the beads of the tire to facilitate insertion and removal of the bag.

The tire spreading machines heretofore used have required in their operation rather careful placement of the tire casing about the bead clamps, resulting in loss of speed and efficiency in the process of recapping tires. In addition, it has been found that the beads of the tires may be damaged by improper clamping caused by the tire casing being positioned off-center relative to the clamping elements.

It is, therefore, an object of this invention to provide an improved tire spreading device which does not require in its operation that the tire casing be exactly centered relative to the clamping elements. It is a further object of this invention to provide a device which is capable within limits of safely clamping a casing to a supporting table in the position in which the casing was initially placed on the table by the operator.

Many of the tire spreading devices heretofore used have required extensive and complicated adjustments to accommodate tire casings of varying sizes, if, indeed, such adjustment were at all possible. It is a further object of this invention to provide a device which will automatically accommodate casings of varying rim sizes. The device is particularly useful in handling passenger car tires of between twelve and nineteen inches in diameter, although not limited to such use.

In certain fluid pressure actuated devices of the prior art, a safety hazard exists due to the possible release of the clamping action on the lower bead while pressure is still applied to the upper bead spreading lugs thereby resulting in the unexpected release of the tire casing, causing it to fly into the air or sustain structural damage by the continued upward and outward movement of the upper bead spreading lugs. It is, therefore, a further object of this invention to provide an improved tire spreading device wherein failure of the actuating fluid pressure system for the clamping operation automatically halts and retrogresses the spreading apparatus to its normal inoperative position.

It is a more specific object of this invention to provide a tire bagging machine comprising a table adapted to receive a tire and preferably supported in an inclined position facing the operator on a suitable frame to facilitate handling of the tire. The table is penetrated by a plurality of radially movable lugs adapted to engage and clamp the lower bead of the tire to the table, after which the operator positions a pair of spreading lugs against the upper bead of the tire to move the beads apart. Means are provided enabling the lower bead engaging lugs to move radially independently of one another after a first lug has engaged the lower tire bead so that all of the lower bead engaging lugs engage that bead before the lugs are moved axially to clamp the lower bead to the table.

Some of the objects of the invention having been stated, other objects will appear when taken in conjunction with the accompanying drawings, in which.

Figure 1:
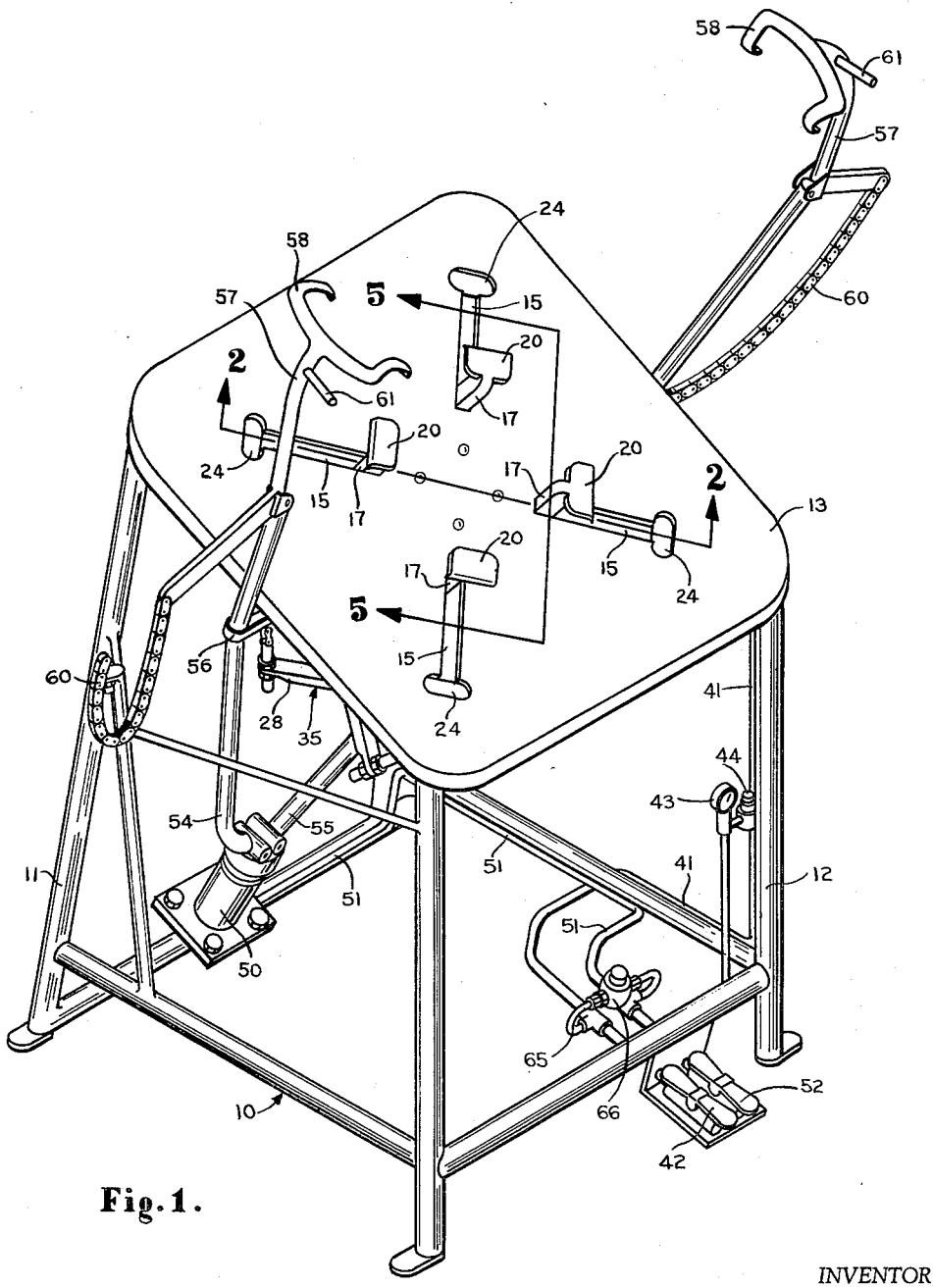
FIGURE 1 is a perspective view of the tire spreading device of the present invention in retracted position ready to receive a tire.

The invention as shown in the drawings comprises a frame 10 including rear legs 11 and relatively short legs 12 which support an inclined table top 13.

The planar surface or table top 13 has a plurality of slots 15 extending radially from adjacent the center of the table to points spaced from the periphery of the table. The table supports a lower or inner bead lug assembly broadly indicated at 16 and including a plurality of lower bead lugs 17, one of which protrudes through each of the slots 15 in the table top 13. Each of the lugs 17 includes an angularly disposed outwardly directed clamping element 20 adapted to engage the inner surface of the lower bead 21 of a tire T positioned on the table top 13 in encircling relation to the bead lugs 17.

Figure 5:
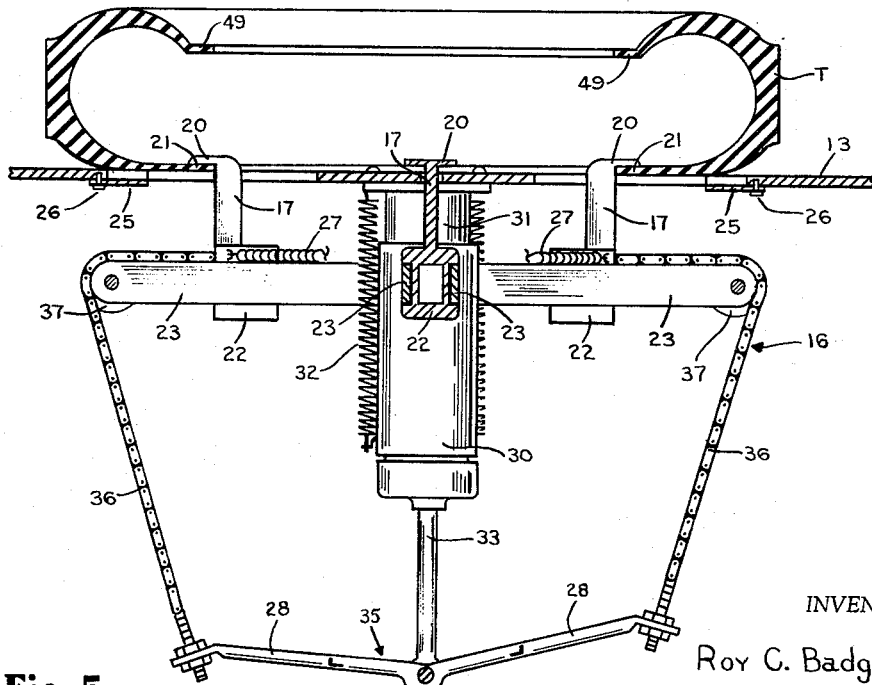
FIGURE 5 is an enlarged fragmentary sectional view, with parts broken away, taken substantially along line 5—5 of FIGURE 1 showing the position of the lower bead lug assembly after the lugs have been moved radially and axially to clamp the lower bead of the tire casing to the table.

The bead lugs 17 are supported for radial movement throughout substantially the length of the slots 15 by slide or carrier members 22 which are preferably of I-shaped cross-sectional configuration (FIGURE 5). The slides 22 are mounted for longitudinal movement on corresponding pairs of tracks or guideways 23, there being a pair of tracks 23 beneath each of the slots 15 in the table top 13. The tracks 23 extend beneath the table 13 on either side of their respective slot 15 and in parallel relation thereto. The slide member 22 is preferably formed from a self-lubricating material such as bronze and may be provided with an interior wicking, not shown, which may be lubricated at periodic intervals to facilitate sliding of slide members 22 along the tracks 23. The lateral spacing of the tracks 23 on either side of their respective slot 15 is advantageous in helping to prevent rubber particles and other foreign matter from accumulating on the tracks 23 as they fall through the slots 15.

The outer end portion of each slot 15 terminates in an enlarged opening 24 of sufficient size to accommodate its respective bead lug 17 and its associated clamping element 20 for ease in assembling the lugs 17 on their slides 22 as may be necessary from time to time after repeated use of the device. Following assembly of the lugs 17 on their respective slides 22, the enlarged openings 24 are closed as by a plate 25 extending across the opening 24 and secured to the lower surface of the table top 13 as by bolts 26. All of the slides 22 are interconnected by generally horizontally disposed springs 27 which normally urge the slides 22 toward the inner ends of their respective slots 15 when the device is inoperative.

The inner ends of each of the radially extending pairs of tracks 23 are fixed to a collar 30 reciprocably mounted on an air cylinder 31 depending from the center portion of the table top 13. The collar 30 is normally held against the lower surface of the table top 13 when the device is in normal inoperative position by a pair of springs 32 extending between the lower surface of the table top 13 and the collar 30.

A piston 31a is reciprocably mounted within the cylinder 31 and a ram or piston rod 33 extends outwardly from the end of the cylinder 31 remote from the table top 13. The free end of the ram 33 terminates in a ball or sphere 33a which forms one component of a ball and socket assembly at the hub 29 of a spider 35. The hub 29 has a cavity 34 which rotatably receives the spherical end portion 33a of the ram 33. The spider 35 includes four arms 28, each of which is spaced beneath and extends radially in parallel relation to one pair of tracks 23. One end of a chain 36 is adjustably connected to the free end of each of the arms 28 on the spider 35. The chains 36 extend over rollers 37 journalled in the free ends of the tracks 23, with the ends of the chains 36 remote from the spider 35 being fixed to respective slide assemblies 22.

An air line 41 (FIGURES 1 and 7) communicates with the interior of the cylinder 31 adjacent its upper end, the air line 41 extending to a three-way valve 42 (FIGURES 1 and 7) and thence through an air gauge 43 and a pressure reducing valve 44 to a source of supply, not shown.

Now, the vertically extending springs 32 which normally urge the collar 30 against the lower surface of the table top 13 are of considerably greater strength than the horizontally disposed springs 27 which interconnect the slides 22. By way of illustration, and not as a limitation, it is noted that in one device which performed satisfactorily, the springs 32 were in the order of about three times the strength of the springs 27. The relative difference in strength between the springs 32 and the springs 27 is important in enabling the bead lugs 17 to move first radially and then axially of the tire to first engage and then clamp the lower bead 21 of the tire T against the table top 13.

Thus, assuming a tire T to be positioned on the table 13 in encircling relation to the retracted lugs 17, the valve 42 is actuated to admit air under pressure into the upper end of the cylinder 31 through the line 41 to move the piston 31a and its ram 33 outwardly and away from the table top 13. As the ram 33 moves the spider 35 away from the table 13 the chains 36 which extend between the spider 35 and their respective slides 22 overcome the relatively weak springs 27 and move the slides 22 with their attached lugs 17 outwardly along their tracks 23 until the lugs 17 engage the lower bead 21 of the tire T.

When outward movement of the slides 22 along their tracks 23 is arrested through engagement of the tire bead 21 by the lugs 17, continued application of air pressure into the cylinder 31 is sufficient to overcome the relatively strong springs 32 and move the collar 30 axially of the tire T and cylinder 31 away from the table 13. Since the tracks 23 are fixed to the collar 30, they are correspondingly moved axially of the tire and away from the table top 13 to draw the clamping elements 20 of the lugs 17 into engagement with the inner surface of the bead 21 to clamp it against the upper surface of the table top 13.

Figure 2:
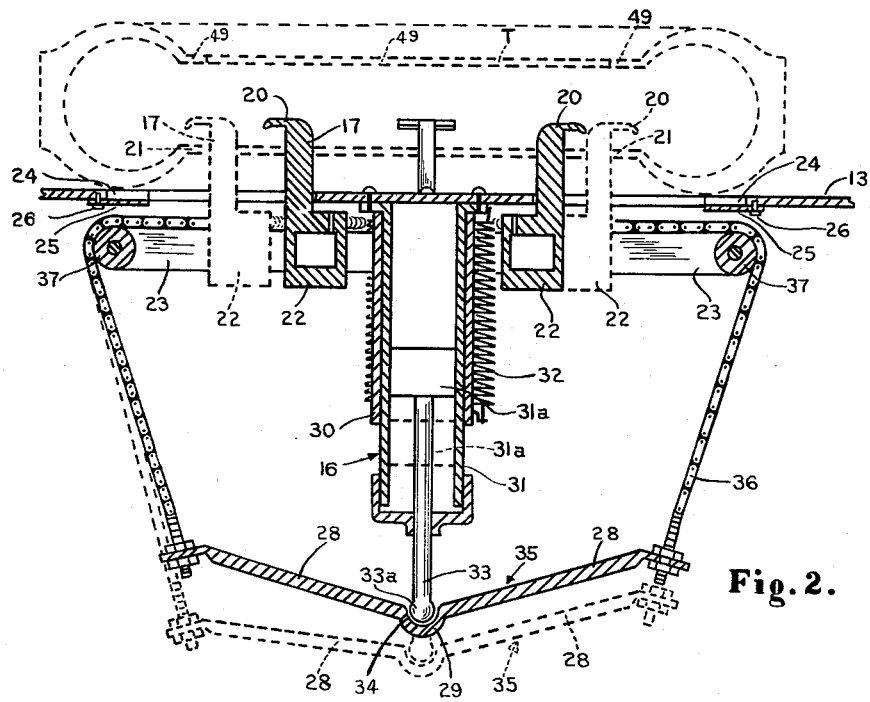
FIGURE 2 is a sectional view with parts broken away, taken substantially along the line 2—2 of FIGURE 1 showing in solid lines the lower bead lug assembly in retracted inoperative position and showing in dotted lines the variable radial extension of the lugs as they engage the bead of an off-center tire casing.

In FIGURE 2 the dotted line representation of the tire T on the table 13 assumes that the tire has been placed on the table off-center in relation to the normally retracted radially movable lugs 17. The solid line illustration of the lugs 17 shows them in their innermost inoperative position withdrawn from the bead 21 of the tire T. The initial introduction of air into the interior of the cylinder 31 through the air line 41 moves the piston 31a from its solid line position to its dotted line position imparting corresponding radial movement to the lugs 17 through the spider 35 and chains 36 in the manner previously described.

Each of the lugs 17 is capable of independent outward or radial movement relative to the other lugs in response to the application of sufficient force to the spider 35 to overcome the springs 27. This is advantageous in that it enables a tire to be quickly and securely clamped to the table without the necessity of first centering the tire relative to each of the four lugs.

It will be noted that the tire T has been shown as being positioned more closely adjacent the right hand lug 17 than to the left hand lug shown in solid lines in FIGURE 2. Outward radial movement of the right hand lug 17 in FIGURE 2 is arrested when it engages the bead 21 while the outward radial movement of the left hand lug 17 in FIGURE 2 continues after the right hand lug 17 has stopped and until the left hand lug 17 engages the bead 21. It will be understood that the other two lugs, not shown in FIGURE 2, move in the same manner. There is no axial movement of the lugs or their attached collar 30 relative to the tire T and cylinder 31 until all of the lugs 17 have engaged the bead 21. In the case of an off-center tire such as shown in FIGURE 2, the first lug to engage the bead 21 pauses until all of the other lugs have engaged the bead, at which time continued application of air pressure to the piston 32 will simultaneously move the collar 30, tracks 23, and lugs 17 axially of the tire and toward the table top 13 to clamp the bead 21 between the elements 20 and the table top 13.

In order to compensate for the greater distance between the slide 22 for the right hand lug 17 in FIGURE 2 and its roller 37 as compared to the distance between the slide 22 for the left hand lug 17 in FIGURE 2 and its roller 37, the spider 35 pivots about the ball and socket joint at its hub as shown in the dotted line position of the spider 35 in FIGURE 2. It will, of course, be understood that the pivotal movement of the spider 35 is not limited to movement in the direction shown in the drawings, such illustration being for example only. The spider 35 is capable of pivoting in any direction necessary to compensate for the differences in the length of travel of the lugs 17 on their respective slides 22 occasioned by a tire being off-center on the table 13.

The apparatus for engaging the upper bead 49 on the tire T comprises an air cylinder 50 fixed to the rear of the frame 10 and operatively connected adjacent its lower end to an air line 51 which extends to a three-way valve 52 and thence to a source of air pressure, not shown. The other side of the valve 52, as is valve 42, is open to the atmosphere to provide an exhaust or blow-off port through which the system may be relieved from pressure.

A ram 53 extends upwardly from the cylinder 50 and is pivotally connected to the lower ends of a pair of upwardly diverging arms 54, 55 which extend through laterally projecting retaining loops 56 fixed to opposite sides of the table top 13. The upper ends of the arms 54, 55 are pivotally connected to the medial portion of a pair of spreading arms 57. The arms 57 extend toward each other from their pivotal connection with their respective arms 54, 55 and the proximal ends of the arms 57 are provided with upper bead engaging hooks 58. The distal end portions of the arms 57 project laterally beyond the table 13 and are adjustably connected by chains 60 to upstanding portions of the frame 10. The medial portions of the arms 57 adjacent the hooks 58 are preferably provided with handle members 61 to facilitate manual positioning of the hooks 58 about the upper bead 49 of the tire.

Figure 3:
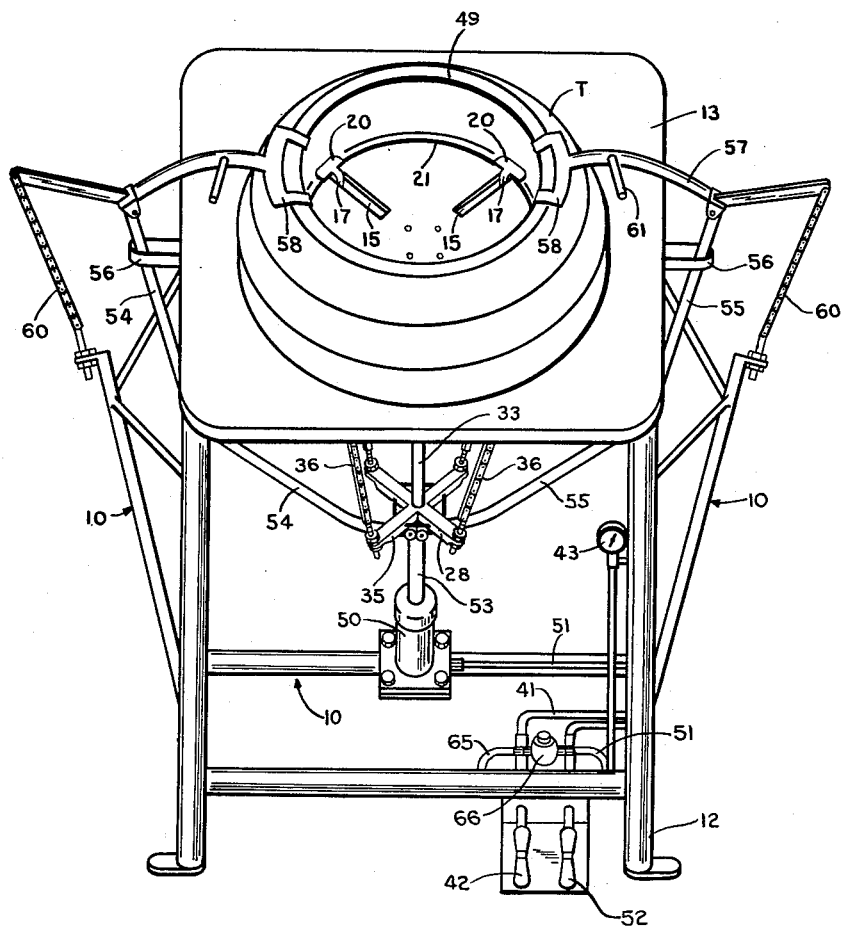
FIGURE 3 is a front view of the device in extended position and spreading apart the beads of a tire.
Figure 4:
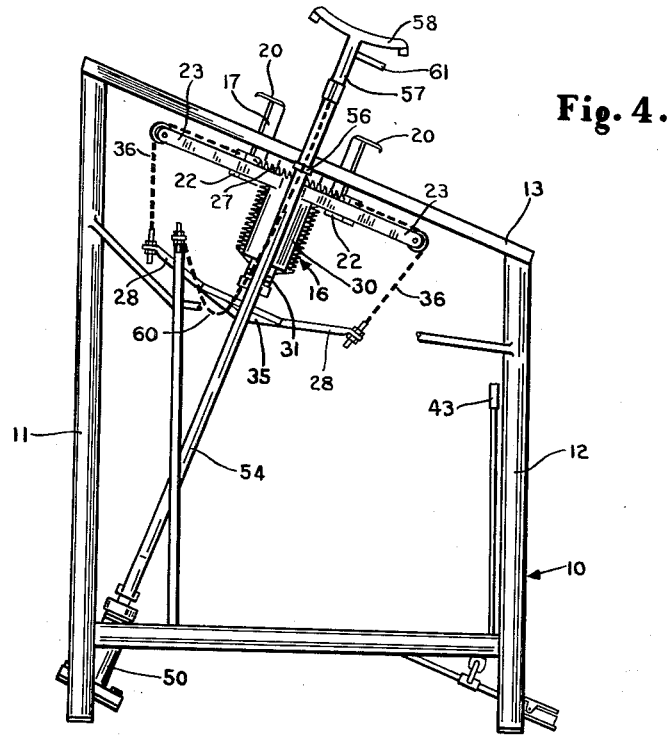
FIGURE 4 is a side view of the device in retracted inoperative position and omitting a portion of the frame for clarity.
Figure 6:
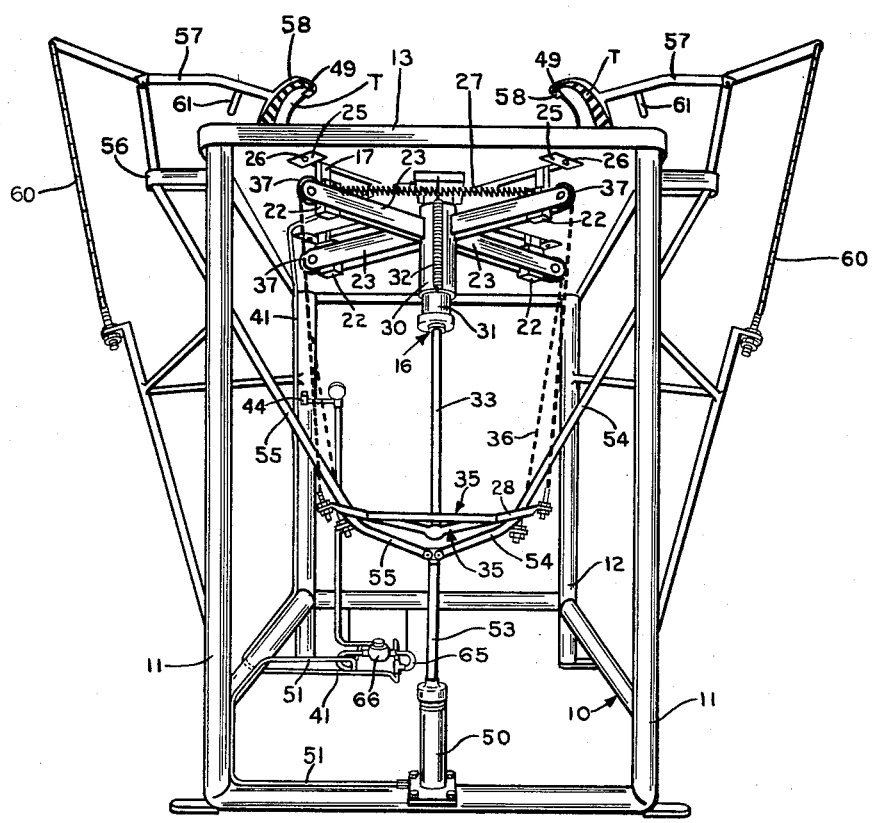
FIGURE 6 is a rear view of the device in extended bead spreading position.

In operation, assuming all bead lugs to be retracted to normal inoperative position and a tire to be positioned on the table 13, such as indicated in FIGURE 2, an operator initially actuates valve 42 to admit air through line or conduit 41 to the cylinder 31 and activate the lower bead lugs 17 to clamp the tire to the table in the manner described. After the lower bead is securely clamped to the table 13 by the lugs 17, the operator manually positions the hooks 58 about the upper bead 49 and thereafter actuates the valve 52 to admit air to the cylinder 50 to move the ram 53 upwardly as shown in FIGURE 6. Corresponding movement is thereby imparted to the arms 54, 55 to raise the outer ends of the clamp arms 57 to the limit of the chains 60, thereby spreading the upper bead 49 away from the lower bead 21 to open the tire casing T as shown in FIGURE 3.

When it is desired to release the tire, both valves 42 and 52 are simultaneously manipulated to release air from the cylinders 31 and 50 through their respective air lines 41 and 51 and the blow-off or exhaust ports in the 3-way valves 42 and 52. It will be noted that valves 42 and 52 are located closely adjacent one another so they may be easily manipulated simultaneously by the operator to relieve air pressure. Of course, if desired, valve 52 may be vented to the atmosphere in advance of valve 42, but simultaneous venting is preferred for efficiency. Thereafter the hooks 58 may be manually removed from about the upper bead 49 and the tire removed from the table, it being understood that the lugs 17 will be retracted to inoperative position by springs 27, thereby releasing the lower bead of the tire.

Figure 7:
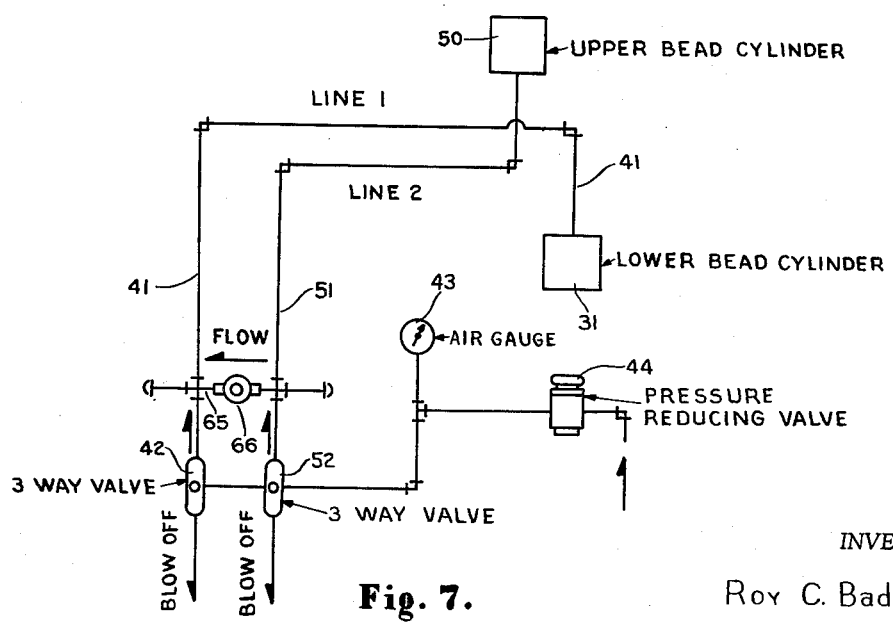
FIGURE 7 is a schematic illustration of the fluid pressure system used to power the upper and lower bead spreading lugs.

Referring particularly to FIGURE 7, it will be noted that the air system includes a lateral connection or bypass 65 between the lines 41 and 51 intermediate the valves 42, 52 and their respective cylinders 31 and 50. A check valve 66 arranged to admit air under pressure from the line 51 to the line 41, but to be closed against the passage of air from line 41 to line 51 is incorporated in the bypass 65. The purpose of the check valve 66 is to equalize the pressure in the lines 41 and 51 in such a way as to provide a safety device against accidental activating of the upper bead engaging hooks without simultaneously clamping the lower bead to the table. Also, the preferred pressure system serves as a safety device to prevent the lower bead engaging lugs from being moved away from the tire until after the upper bead engaging hooks have been removed. Thus, assuming an operator actuates valve 42 to remove air from cylinder 31 and disengage the lugs 17 from the lower bead before purging cylinder 50 through manipulation of switch 52, the pressure in line 51 will flow through check valve 66 and be exhausted through the exhaust port in the three-way valve 42. Pressure on the upper bead will thus be released simultaneously with the release of pressure on the lower bead, after which the tire may be manually removed from the table.

There is thus provided an improved device for spreading apart the beads of tires of varying diameters which device is operable in such a manner as to permit maximum access to the interior of the tire and wherein safety means are provided to prevent accidental displacement of the tire from the table.

In the drawings and specification there have been set forth preferred embodiments of the invention, and although specific terms are employed, they are used in a generic and descriptive sense only and not for purposes of limitation, the scope of the invention being defined in the claims.

I claim:
1. Apparatus for clamping the bead of a tire comprising:
   (a) tire supporting means;
   (b) a plurality of tire bead engaging lugs normally grouped in proximity to each other in inoperative position about an axis adjacent the axis of a tire to be supported by said tire supporting means;
   (c) means for moving the lugs radially outwardly from their inoperative position adjacent the axis of a tire supported on the tire supporting means to engage the bead of the tire;
   (d) said means for moving the lugs radially being capable of providing continued radial movement to remaining lugs into bead contact after one or more lugs have contacted said bead when the axis of the tire does not coincide with the axis of the lugs;
   (e) means for moving the lugs axially of the tire after the lugs have engaged the bead to clamp the tire to the tire supporting means; and
   (f) means for removing the lugs from engagement with the tire to release the tire.

2. Apparatus for spreading the beads of a tire comprising:
   (a) tire supporting means;
   (b) a first group of tire bead engaging lugs normally grouped in proximity to each other in inoperative position about an axis adjacent the axis of a tire to be supported by said tire supporting means;
   (c) means for moving the lugs in said first group of lugs radially outwardly from their inoperative positions to engage one bead of a tire carried by said tire supporting means;
   (d) said means for moving said first group of lugs radially being capable of providing continued radial movement to remaining lugs into bead contact after one or more lugs have contacted said bead when the axis of the tire does not coincide with the axis of the lugs;
   (e) means for moving said first group of lugs axially of the tire after all of the lugs in said first group of lugs have engaged said one bead of the tire to clamp the tire to the tire supporting means;
   (f) a second group of tire bead engaging lugs engagable with the other bead of said tire;
   (g) means for moving said second group of lugs away from the first group of lugs to spread the tire beads apart; and
   (h) means for returning all of the lugs to inoperative position to release the tire.

3. Apparatus for clamping the bead of a tire comprising:
   (a) a plurality of tire bead engaging lugs normally grouped in proximity to each other in inoperative position;
   (b) tire supporting means adapted to support a tire in encircling relation to said lugs;
   (c) fluid pressure means including a ram operatively connected to said lugs to impart first radial and then axial clamping movement to the lugs relative to the tire; and
   (d) said fluid pressure means being capable of imparting continued radial movement to remaining lugs into bead contact after one or more lugs have contacted said bead when the axis of the tire does not coincide with the axis of the lugs.

4. Apparatus for clamping the bead of a tire comprising:
   (a) a plurality of tire bead engaging lugs normally grouped in proximity to each other in inoperative position;
   (b) tire supporting means adapted to support a tire in encircling relation to said lugs;
   (c) a fluid pressure system including a cylinder normally housing a reciprocable ram movable axially of a tire positioned on said tire supporting means;
   (d) a spider including,
      (i) an arm for each of said lugs and
      (ii) a hub connected to the ram;
   (e) means supporting each of said lugs for reciprocating movement radially of a tire positioned on the tire supporting means;
   (f) a flexible connection extending between each arm of the spider and one of the lugs and trained about said lug supporting means; and
   (g) means supporting the lug supporting means for reciprocable movement axially of a tire positioned on the tire supporting means.

5. A structure according to claim 4 wherein means are provided for permitting continued radial movement toward the bead of a tire of the remaining lugs after such movement of one or more of the lugs have been arrested through engagement with the tire bead.

6. A structure according to claim 4 wherein said tire supporting means comprises a table supported by a frame and having:
(a) radially extending slots within which said lugs reciprocate and over which a tire is adapted to be positioned,
(i) the slots being of sufficient length to permit their associated lugs to traverse varying distances to engage beads of tires of varying diameter.

7. A structure according to claim 6 wherein the cylinder housing the ram depends from the table adjacent the inner ends of the slots and wherein said last-named means comprises:
(a) a collar encircling the cylinder and from which the lug supporting means radiate for movement with the collar; and
(b) first resilient means normally urging the collar toward a position where the lugs are out of engagement with the bead of a tire positioned on said tire supporting means.

8. A structure according to claim 7 wherein the lug supporting means includes second resilient means normally urging the lugs inwardly and away from the bead of a tire positioned on said tire supporting means, and said second resilient means being of less strength than the first resilient means whereby initial outward movement of said ram will overcome the second resilient means without affecting the first resilient means.

9. A structure according to claim 8 wherein the spider is connected to the ram by a ball and socket joint to permit continued outward movement of the remaining lugs radially of a tire positioned on the table in off-center relation to the axis of the slots after such movement of one or more lugs has been arrested through engagement with the tire bead.

10. A structure according to claim 2 which includes a fluid pressure system comprising:
(a) a first cylinder normally housing a reciprocable ram movable axially of a tire positioned on said tire supporting means and operatively connected to said means for moving the first group of lugs first radially and then axially of the tire;
(b) a second cylinder normally housing a reciprocable ram operatively connected to said means for moving the second group of lugs away from the first group of lugs.

11. A structure according to claim 10 wherein the fluid pressure system includes:
(a) first and second fluid pressure lines for the respective first and second cylinders;
(b) a valve interposed in each line for controlling flow of fluid pressure to its respective cylinder;
(c) a bypass line communicatively connected and extending between said fluid pressure lines at points between the cylinders and their respective valves;
(d) a check valve interposed in said bypass line and operable to prevent fluid pressure in the first line from flowing to the second line while permitting fluid pressure in the second line to flow into the first line when the fluid pressure in the second line exceeds the fluid pressure in the first line; and
(e) both of said control valves being operable to relieve pressure from their respective lines.

12. A structure according to claim 11 wherein:
(a) the control valves for each cylinder are located in sufficient proximity to permit them to be actuated simultaneously to relieve their respective lines of pressure.

References Cited by the Examiner

UNITED STATES PATENTS

| | | |
|---|---|---|
| 1,288,733 | 12/18 | Stevens. |
| 1,490,895 | 4/24 | Gertenslager. |
| 3,002,223 | 10/61 | Rawls. |
| 3,012,272 | 12/61 | Branick. |

WILLIAM FELDMAN, *Primary Examiner.*

MILTON S. MEHR, *Examiner.*